(12) United States Patent
Xie et al.

(10) Patent No.: US 12,007,263 B2
(45) Date of Patent: Jun. 11, 2024

(54) METHOD AND APPARATUS FOR DETERMINING WLR AND WVF IN WET GAS AND MULTIPHASE FLOWS USING AN ELECTROMAGNETIC SENSOR

(71) Applicant: Schlumberger Technology Corporation, Sugar Land, TX (US)

(72) Inventors: Cheng-Gang Xie, Singapore (SG); Massimiliano Fiore, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 267 days.

(21) Appl. No.: 17/597,542

(22) PCT Filed: Jul. 13, 2020

(86) PCT No.: PCT/US2020/041815
§ 371 (c)(1),
(2) Date: Jan. 11, 2022

(87) PCT Pub. No.: WO2021/011477
PCT Pub. Date: Jan. 21, 2021

(65) Prior Publication Data
US 2022/0373375 A1    Nov. 24, 2022

Related U.S. Application Data

(60) Provisional application No. 62/873,510, filed on Jul. 12, 2019.

(51) Int. Cl.
*G01F 1/74* (2006.01)
*G01F 1/44* (2006.01)
*G01F 1/58* (2006.01)

(52) U.S. Cl.
CPC .............. *G01F 1/74* (2013.01); *G01F 1/58* (2013.01); *G01F 1/44* (2013.01)

(58) Field of Classification Search
CPC .............. G01F 1/74; G01F 1/58; G01F 1/44
See application file for complete search history.

(56) References Cited

U.S. PATENT DOCUMENTS

| 6,831,470 | B2 | 12/2004 | Xie et al. |
| 9,645,130 | B2 | 9/2017 | Xie et al. |
| 2013/0327154 | A1* | 12/2013 | Xie .................. G01N 33/28 324/702 |
| 2014/0076035 | A1 | 3/2014 | Henry |
| 2015/0040658 | A1 | 2/2015 | Abyzov et al. |

(Continued)

FOREIGN PATENT DOCUMENTS

| EP | 2788726 A2 | 10/2014 |
| GB | 2569322 A | 6/2019 |
| WO | 2016/042317 | 3/2016 |

OTHER PUBLICATIONS

Substantive Exam issued in Saudi Arabia Patent Application No. 522431356 dated May 29, 2023, 20 pages with English translation.

(Continued)

*Primary Examiner* — Peter J Macchiarolo
*Assistant Examiner* — John M Royston
(74) *Attorney, Agent, or Firm* — Jeffrey D. Frantz (57) ABSTRACT

Embodiments described herein provide methods and apparatus to determine water-to-liquid ratio and water volume fraction for high gas-volume-fraction wet-gas flows or multiphase flows.

20 Claims, 9 Drawing Sheets

(56) References Cited

U.S. PATENT DOCUMENTS

2016/0076926 A1* 3/2016 McCann .............. G01F 1/60
                                                   73/861.04
2016/0245684 A1 8/2016 Wee et al.

OTHER PUBLICATIONS

By Li Ke et al Electromagnetic Flow Meters Achieve High Accuracy in Industrial Applications Analog Dialogue 48-02, Feb. 2014, p. 6.
Written Opinion and International Search Report of the equivalent PCT Application PCT/US2020/041815 filed on Jul. 13, 2020.
Results of Patentability and Search Report issued in Russian Patent Application No. 2022103466 dated Sep. 13, 2023, 22 pages with English translation.

* cited by examiner

METHOD AND APPARATUS FOR DETERMINING WLR AND WVF IN WET GAS AND MULTIPHASE FLOWS USING AN ELECTROMAGNETIC SENSOR

CROSS-REFERENCE TO RELATED APPLICATIONS

This patent application is a National Stage Entry of International Patent Application No. PCT/US2020/041815, filed on Jul. 13, 2020, which claims benefit of U.S. Provisional Patent Application Ser. No. 62/873,510 filed Jul. 12, 2019, which is entirely incorporated herein by reference.

BACKGROUND

This disclosure relates generally to hydrocarbon production and, more particularly, to methods and apparatus for determining water-to-liquid ratio of multiphase flows.

DESCRIPTION OF THE RELATED ART

Most oil-gas wells produce a mixture of oil, water, and gas. During hydrocarbon production, a determination of flow rates of individual phases (e.g., oil, gas, water, etc.) of a multiphase flow is desirable. The individual phase flow rates can be derived from the measured phase volume fractions and phase flow velocities. A determination of other properties of the multiphase mixture is also desirable, including the presence and salinity of produced water or injected water, the water-to-liquid ratio (WLR), the water volume fraction (WVF). Such properties can be used to determine information about the mixture and may affect other measurements being made on the multiphase mixture.

SUMMARY

Embodiments described herein provide a method, comprising obtaining a plurality of electromagnetic property measurements from a flowing multiphase fluid mixture at an electromagnetic sensor location at or downstream a mixing device; obtaining an average, maximum, and minimum of the plurality of electromagnetic property measurements; and determining a liquid fraction of the multiphase fluid mixture based on the average, maximum, and minimum.

Other embodiments described herein provide a method, comprising obtaining a plurality of permittivity and conductivity measurements from a flowing multiphase fluid mixture at an electromagnetic sensor location at or downstream a mixing device; obtaining an average, maximum, and minimum of the plurality of permittivity measurements and of the plurality of conductivity measurements; determining a liquid fraction of the multiphase fluid mixture based on the average, maximum, and minimum of one or both of the permittivity measurements and the conductivity measurements; and determining a water-to-liquid ratio of the multiphase fluid mixture based on the liquid fraction.

Other embodiments described herein provide a method, comprising repeatedly measuring permittivity and conductivity of a flowing multiphase fluid using an electromagnetic sensor with sampling rate of at least 1 kHz to obtain at least 100 measurements; obtaining an average, maximum, and minimum of the permittivity measurements and of the conductivity measurements; determining a liquid fraction from the average, maximum, and minimum of one or both of the permittivity measurements and the conductivity measurements; and determining a water-to-liquid ratio of the multiphase fluid based on the liquid fraction and based on one or both of the permittivity measurements and the conductivity measurements.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
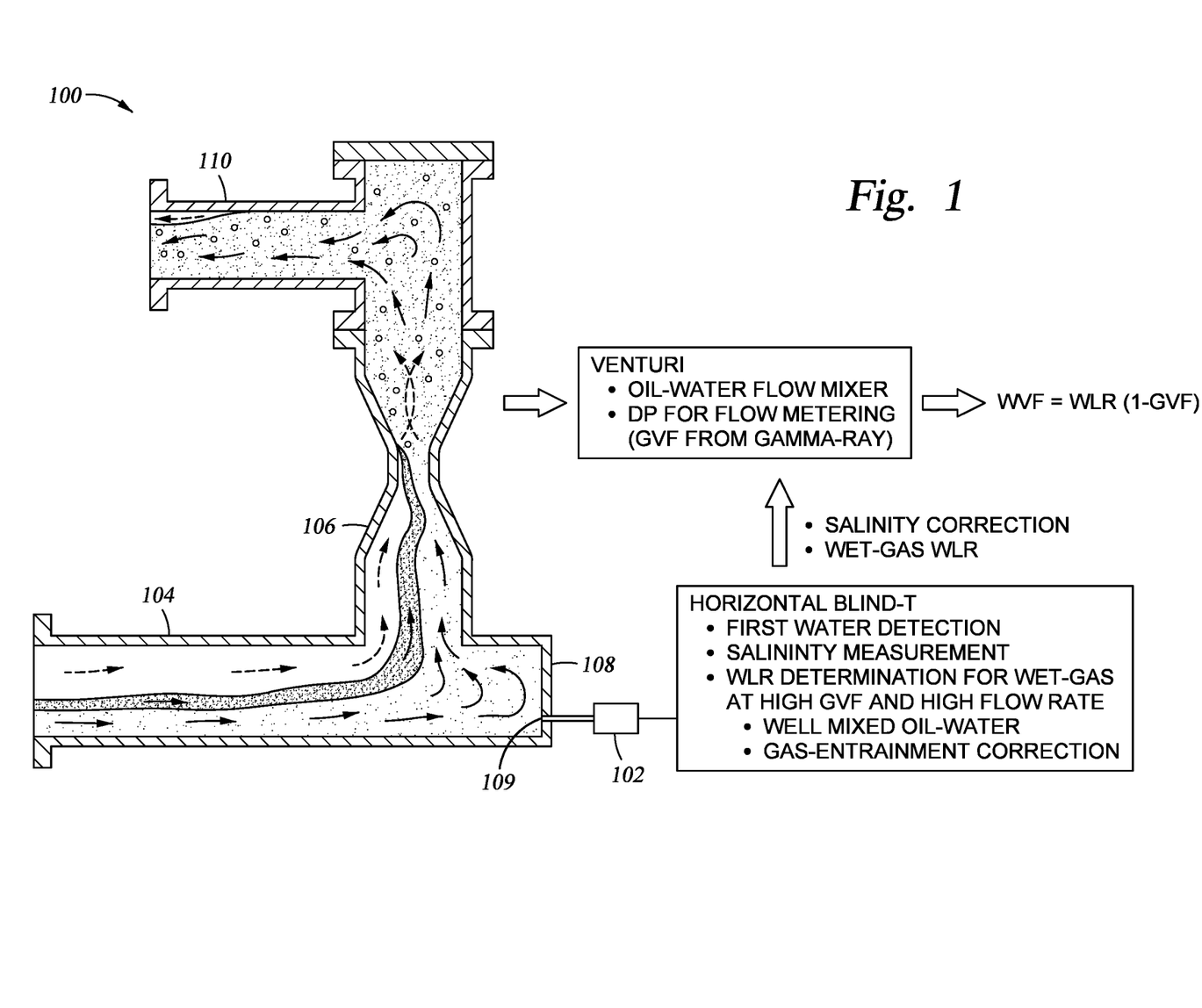
FIG. 1 is an apparatus according to one embodiment.

Some embodiments of the disclosure describe methods and apparatuses of measuring the WLR of high flow-rate, high gas-volume-fraction (GVF) wet-gas flow or multiphase flow (with e.g. GVF<95%) by interpreting the mixture permittivity or the mixture conductivity rapidly measured by an electromagnetic (EM) sensor installed at the horizontal blind-tee end-flange as shown in FIG. 1.

Figure 4A:
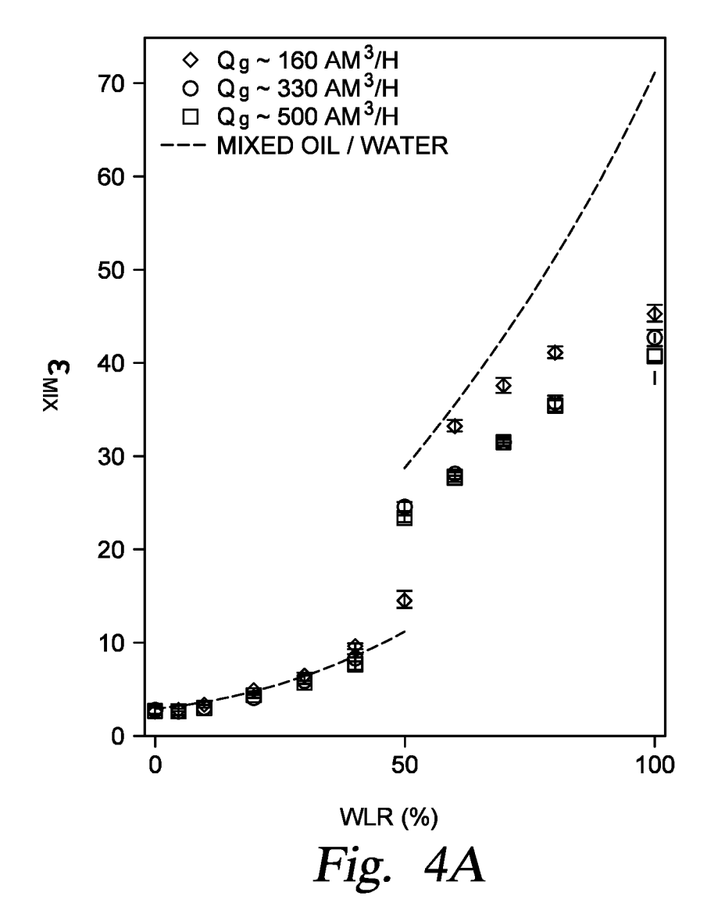
FIGS. 4A and 4B are graphs of permittivity (FIG. 4A) and conductivity (FIG. 4B) plotted vs. reference WLR according to one embodiment.
Figure 4B:
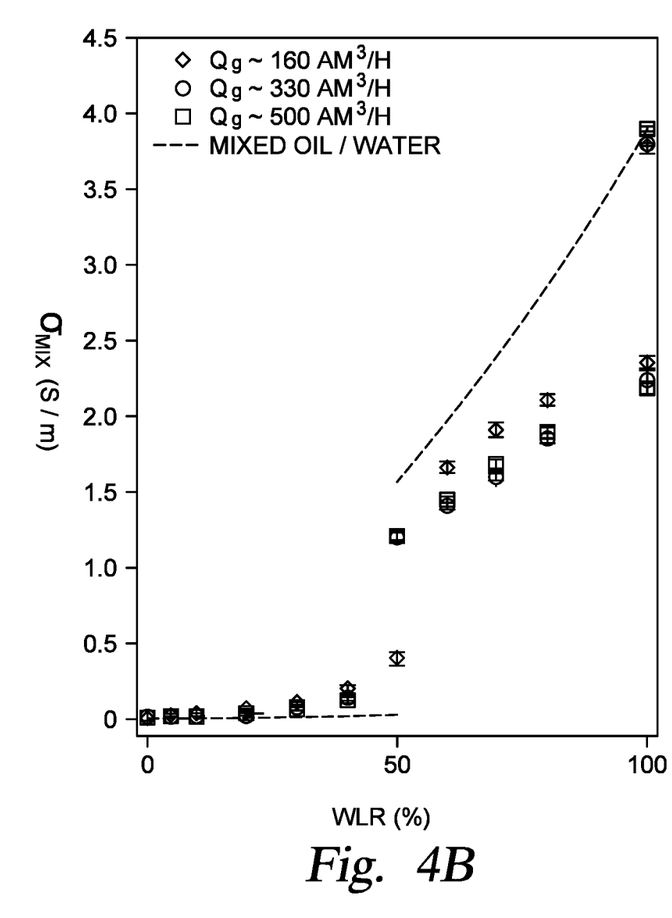

FIG. 1 shows an embodiment of an apparatus 100 for measuring WLR and WVF (as well as water salinity, and for detecting the presence or absence of water) of high-flowrate, high-GVF wet-gas or multiphase flow by an EM sensor (such as a radio-frequency (RF) or microwave sensor) installed at the horizontal blind-tee end-flange. For high flowrate, high-GVF wet-gas or multiphase flows, the oil-water liquid mixture at the horizontal blind-tee end-flange liquid-rich region tends to be well mixed, so the interpretation of the mixture permittivity and the mixture conductivity rapidly measured by the EM sensor provides a good estimate of the water-to-liquid ratio (WLR). In some cases, the effect of entrained gas in the liquid on the measured mixture permittivity and the mixture conductivity must be corrected to achieve a good WLR determination. The correction based on gas entrainment is especially important for water-continuous flows with relatively high WLRs, as illustrated in FIGS. 4A and 4B.

The apparatus 100 has an EM sensor 102 at a liquid-rich mixing location 109 located near the lower part of an end-flange 108 of a horizontal blind-tee 104 carrying a high flow-rate, high-GVF wet-gas or multiphase flow. As described further below, by interpreting the mixture permittivity or the mixture conductivity, rapidly measured by the EM sensor 102, which can be a microwave open-coaxial reflection sensor, at the liquid-rich mixing location 109, WLR can be determined from the data gathered by the EM sensor 102. In FIG. 1, a differential-pressure flow meter 106 based on a flow pipe constriction, for example a Venturi tube, connects the horizontal blind-tee 104 with an outlet 110, and the liquid-rich mixing location 109 is located on the inlet side of the flow meter 106. The pipe constriction-based differential-pressure flow meter 106 performs further flow mixing of the incoming wet-gas or multiphase flow, hence may also acts as a flow mixer. For high flow-rate, high-GVF wet-gas or multiphase flows, the oil-water liquid mixture at the horizontal blind-tee end-flange liquid-rich region tends to be reasonably well mixed and the interpretation of the mixture permittivity and the mixture conductivity rapidly measured by the EM sensor may provide a good estimate of the WLR by applying a correction for gas entrainment. Thus, measurement of EM properties of the flowing fluid can be performed upstream of the flow meter 106 with reasonable results, especially for high-rate high-GVF wet gas flows where the EM sensor is at a liquid-rich location with a much lower local GVF than the pipe-averaged GVF. Salinity of the liquid phase can also be determined from the EM sensor data, and the presence of water can be detected.

In the apparatus 100, the fluid mixture approaches the EM sensor 102 flowing along the horizontal blind-tee 104 toward the end flange 108 and is forced to turn 90 degrees to flow into the flow meter 106. The 90-degree turn introduces turbulence in the flow at the end flange 108 and at the mixing location 109 that mixes the phases of the fluid mixture to produce a mixed fluid that can be satisfactorily measured by the EM sensor 102 with a localized sensing volume. The fluid flows through the pipe constriction-based flow meter 106, which further mixes the phases of the fluid, into the outlet 110 where the fluid is again forced to turn 90 degrees at a blind-tee of the outlet 110.

Measuring wet-gas or multiphase flow representative WLR at a liquid-rich location where oil-water liquid is much better mixed than in the horizontal blind-tee region, such as at the downstream of a pipe constriction-based differential-pressure flow meter (also a good flow mixer), such as a venturi (FIG. 2), is frequently more accurate than measurements at other locations, for example where flow conditions alone are insufficient to provide good fluid mixing. Where flow velocity is low, for example in some cases less than about 10 m/sec, a mixing device can improve oil-water mixing so that representative WLR measurements can be taken within, or downstream of, the mixing device. Such techniques can extend the useful flow-rate or GVF range suitable for WLR determination using measured EM properties of a flowing multiphase fluid, and can also remove the need of liquid sampling for manual WLR determination. In some high flow-rate applications where oil-water is well mixed in a vertical pipe section, the use of a flow mixer upstream of an EM sensor located at the vertical pipe section may not be needed.

Figure 2:
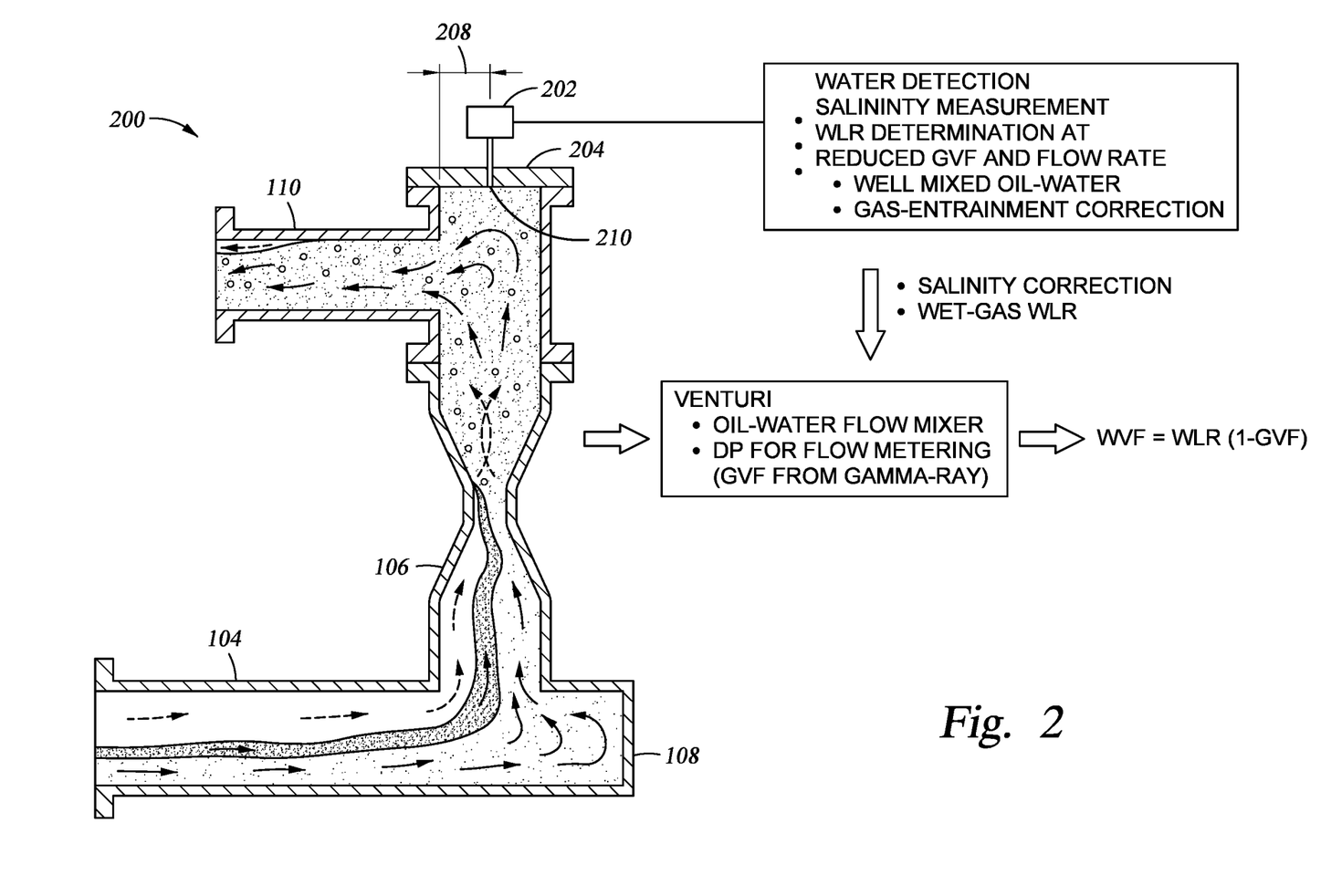
FIG. 2 is an apparatus according to one embodiment.

FIG. 2 shows an apparatus embodiment 200 for measuring the WLR (as well as water salinity, and for detecting the presence or absence of water) of wet-gas or multiphase flows by placing an EM sensor, such as an RF/microwave reflection sensor, downstream of a pipe constriction-based differential-pressure flow meter, such as a Venturi, or a mixer. The apparatus 200 has an EM sensor 202 positioned at an appropriate distance downstream of the flow meter or the mixer, at a liquid-rich mixing location 210 that is adjacent to a vertical blind flange 204 in the outlet 110. Here, the EM sensor is located in the blind flange 204 at a maximum radial distance 208 from the blind-end vertical wall of the outlet 110. The mixed fluid exits the flow meter or mixer 106 and enters the outlet 110, where the fluid is forced to turn 90 degrees at the blind flange 204.

The apparatus 200 is useful for determining WLR where GVF and/or flow rate are reduced by utilizing the flow meter or mixer 106 to give a well-mixed oil-water fluid at a liquid rich location for measurement. Water volume fraction (WVF=(1−GVF)×WLR) may be derived from GVF determined by a MPFM such as a gamma-ray or an RF/microwave transmission based instrument, which can be located in or near the pipe constriction-based differential-pressure flow meter or mixer 106 as shown in FIG. 2. In the example of a Venturi, the MPFM can be coupled to the Venturi to determine GVF. The WLR determined by the EM sensor may be used by the MPFM to improve GVF (and WVF) determination.

Figure 3:
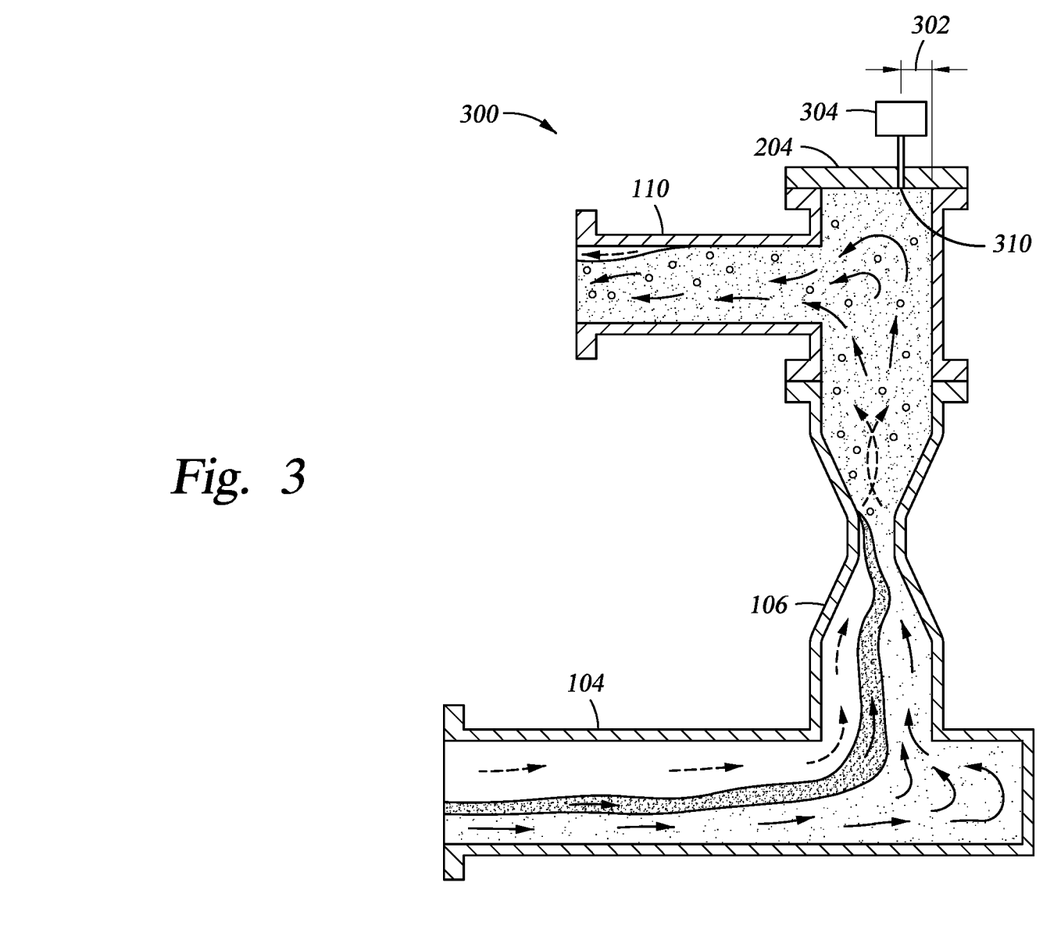
FIG. 3 is an apparatus according to one embodiment.

FIG. 3 shows an apparatus embodiment 300 similar to the apparatus 200, with an EM sensor 304 located downstream of the pipe constriction-based flow meter or mixer 106. Alternative to the embodiment of FIG. 2, here the EM sensor front aperture is located near the inner-wall (liquid-rich) region and near the horizontal blind-tee outer bend of the vertical pipe work (which tends to have even more liquid at high-GVF wet-gas flow conditions). The EM sensor 304 is located at an appropriate distance downstream of the flow meter or the mixer, at a liquid-rich mixing location 310 in the blind flange 204 adjacent to the vertical wall of the outlet 110. The mixing location 310, in this case, is located a radial distance 302 from the vertical wall that is less than a maximum radial distance from the vertical wall (i.e. a radius of the blind-end section of the outlet 110). In some cases, the mixing location 310 is selected to coincide with a maximum mixing region adjacent to the vertical wall. In other cases, the mixing location 310 is selected in a liquid-rich region of the flow profile. The exact location of the EM sensor can be selected, or even varied, depending upon the characteristics of the flow process. For example, if flow rates and/or phase compositions of the wet gas stream change, a fluid flow model can suggest optimal locations for an EM sensor to sense electrical conductivity (water-rich), permittivity, capacitance (oil-rich), inductance, or other EM properties with desired process response.

FIG. 4A is a graph of an example mixture permittivity $\varepsilon_{mix}$ plotted versus reference WLR. FIG. 4B is a graph of mixture conductivity $\sigma_{mix}$ plotted vs. the reference WLR. Permittivity and conductivity for FIGS. 4A and 4B are measured by an RF/microwave reflection sensor installed near-wall at top vertical end-flange (i.e. mixing location 310) for GVF=96% and for total gas flow rate at 160, 330 and 500 am$^3$/h. Gas-entrainment level in the liquid is the degree of departure of the data points from "mixed oil/water" line. The "mixed oil/water" lines show a relationship between (gas-free) oil-water mixture permittivity and WLR and between (gas-free) oil-water mixture conductivity and WLR. In the conductivity graph, oil-continuous flow with relatively low WLRs may be identified from the measured mixture conductivity $\sigma_{mix}$ less than a threshold (such as 0.5 S/m). The graphs of FIGS. 4A and 4B also show an effect of gas entrainment on measured gas-liquid flow permittivity and conductivity.

As illustrated by the test results in FIGS. 4A and 4B (of the embodiment shown in FIG. 3), a microwave open-coaxial reflection sensor measures near-wall the mixture permittivity $\varepsilon_{mix}$ and the mixture conductivity $\sigma_{mix}$ of the process fluid in the vicinity of the sensor front aperture with a shallow sensitivity depth of ~2 mm into the flow). The mixture permittivity $\varepsilon_{mix}$ and the mixture conductivity $\sigma_{mix}$ can be expressed as effective-medium formulations:

$$\varepsilon_{mix} = f_1(WLR, \alpha_{liquid}, \varepsilon_{water}, \varepsilon_{oil}, \varepsilon_{gas}) \quad (1)$$

$$\sigma_{mix} = f_2(WLR, \alpha_{liquid}, \sigma_{water}) \quad (2)$$

where $\alpha_{liquid}$ is the actual liquid fraction of the flow mixture in the sensing volume of the EM sensor. Note that $\alpha_{liquid} = 1 - \alpha_{gas}$, where $\alpha_{gas}$ is the gas fraction entrained in the liquid in the sensing volume of the sensor. Equations (1) and (2) relate the liquid fraction (=1−gas entrainment fraction) and WLR to measured mixture permittivity and/or mixture conductivity values, and to the (usually known) values of the constituent single-phase water, oil and gas; note that gas and oil electrical conductivities are omitted from Equation (2), being substantially zero in comparison with that of the water, i.e. $\sigma_{oil} = 0$, $\sigma_{gas} = 0$). FIGS. 4A and 4B illustrate the effect of gas entrainment on the measured permittivity $\varepsilon_{mix}$ and the mixture conductivity $\sigma_{mix}$, as a function of WLR, in comparison with their respective gas-free values.

We may use appropriate permittivity-mixing and conductivity-mixing models (such as the well-known Bruggeman, Maxwell-Garnett, or Ramu-Rao oil-water mixing laws) and the extension to gas-liquid mixtures to express Equations (1) and (2) as follows:

$$\varepsilon_{mix} = \varepsilon_{water} \times f(WLR) \times g(\alpha_{liquid}) \text{ water-continuous} \quad (3)$$

$$\sigma_{mix} = \sigma_{water} \times f(WLR) \times g(\alpha_{liquid}) \text{ water-continuous} \quad (4)$$

$$\varepsilon_{mix} = \varepsilon_{HC} \times h(WLR) \text{ oil-continuous} \quad (5)$$

Where function kernel f(WLR) represents a dielectric mixing law for a water-continuous oil-water liquid mixture, function $g(\alpha_{liquid})$ represents a factor to include the effect of gas-entrained liquid fraction; function h(WLR) is the oil-continuous counterpart of f(WLR). The oil-gas hydrocarbon (HC) permittivity may be modelled by a gas-oil mixing model, as a function of $\varepsilon_{oil}$, $\varepsilon_{gas}$, and $\alpha_{liquid}$:

$$\varepsilon_{HC} = \varepsilon_{HC}(\varepsilon_{oil}(T,P), \varepsilon_{gas}(T,P), \alpha_{Liquid}) \quad (6)$$

where T is the measured fluid temperature and P is the measured fluid pressure.

Note that from Equations (3) and (4), for water-continuous flows, the ratio of $\sigma_{mix}$ to $\varepsilon_{mix}$ equals to that of $\sigma_{water}$ to $\varepsilon_{water}$ (independent of the variations in the local WLR, local liquid fraction, or local GVF, as disclosed in Schlumberger U.S. Pat. No. 6,831,470). The water conductivity $\sigma_{water}$ (and salinity $S_{water}$) and water permittivity $\varepsilon_{water}$ can be determined from this ratio $$\frac{\sigma_{mix}}{\varepsilon_{mix}}$$

a measured by the WLR-sensing RF/microwave EM sensor and from the measured fluid temperature (T) and pressure (P) by using an appropriate (NaCl) brine dielectric model. Hence, we have:

$$(\sigma_{water}, \varepsilon_{water}, s_{water}) = f_3\left(\frac{\sigma_{mix}}{\varepsilon_{mix}}, T, P\right). \quad (7)$$

We can also determine water density $\rho_{water}$ from the determined salinity by using an empirical model (such as that of Rowe A M, Chou J C S (1970) Pressure-volume-temperature-concentration relation of aqueous NaCl solutions. Journal of Chemical Engineering Data, 15, 61-6):

$$\rho_{water} = f_4(s_{water}, T, P) \quad (8).$$

From Equations (3), (4) and (5) above, we may express the WLR as a function of the ($\varepsilon_{mix}$, $\sigma_{mix}$) and ($\varepsilon_{water}$, $\sigma_{water}$) determined by the RF/microwave EM sensor:

$$WLR \leftarrow f(WLR) = \left(\frac{\varepsilon_{mix}}{\varepsilon_{water}}\right)\frac{1}{g(\alpha_{liquid})} \text{ water-continuous} \quad (3a)$$

$$WLR \leftarrow f(WLR) = \left(\frac{\sigma_{mix}}{\sigma_{water}}\right)\frac{1}{g(\alpha_{liquid})} \text{ water-continuous} \quad (4a)$$

$$WLR \leftarrow h(WLR) = \frac{\varepsilon_{mix}}{\varepsilon_{HC}(\varepsilon_{oil}, \varepsilon_{gas}, \alpha_{liquid})} \text{ water-continuous.} \quad (5a)$$

It has been found (and illustrated in FIGS. 4A and 4B) that the WLR of an oil-continuous flow (of low WLRs) is much less sensitive to the entrained gas fraction in liquid than a water-continuous flow (of high WLRs). It may be not necessary to correct the effect of entrained-gas for oil-continuous flows for WLR determination. It is relatively easy to identify which liquid phase is continuous from the value of the measured mixture conductivity (see FIG. 4B).

Embodiments of the disclosure may estimate the liquid fraction $\alpha_{liquid}$ of the 3-phase mixture in the sensing volume of the EM sensor using statistics of EM measurement properties. Repeated or continuous time-series measurements of mixture permittivity and/or mixture conductivity or their representative values are rapidly sampled over a short time window to obtain a plurality of measurement. Statistic values such as mean, variance, root-mean-square, maximum, and minimum values of the plurality of time-series measurements of each parameter are determined. Data sampling rate can be from 1 kHz upward to MHz sampling rates, so that sampling for a short period of time, such as 0.1 sec to 1 sec or 2 sec, yield a large number of measurements (hundreds, thousands, millions) for statistical analysis. A rapid measurement EM sensor, sampling for example at 10 kHz can measure mixture permittivity and mixture conductivity or their representative values repeatedly in time to determine average (mean) values ($\varepsilon_{avg}$, $\sigma_{avg}$) over a moving time window of a short duration (such as $\Delta t = 1$ second, so that there are ~10 k data samples within each $\Delta t$). Over each time-window $\Delta t$, the variance, maximum and minimum values of the mixture permittivity ($\varepsilon_{var}$, $\varepsilon_{max}$, $\varepsilon_{min}$), or the variance, maximum and minimum values of the mixture conductivity ($\sigma_{var}$, $\sigma_{max}$, $\sigma_{min}$) are also processed.

We may relate the (local) liquid fraction $\alpha_{liquid}$ within the sensing volume of the EM sensor as follows:

$$\alpha_{liquid}(\varepsilon) \sim f_5(\varepsilon_{avg}, \varepsilon_{min}, \varepsilon_{max}, \varepsilon_{min}; \varepsilon_{var}) \quad (9)$$

$$\alpha_{liquid}(\sigma) \sim f_6(\sigma_{avg}, \sigma_{min}, \sigma_{max}, \sigma_{min}; \sigma_{var}) \quad (10).$$

Other statistical parameters of EM sensor time-series data, such as RMS value, skewness, kurtosis may be included in the above equations. A machine learning (ML) approach may be used to determine the liquid fraction using EM sensor time-series statistical data as input features. The following is an illustrating and non-limiting example of Equations (9) and (10):

$$\alpha_{liquid}(\varepsilon) \sim (\varepsilon_{avg} - \varepsilon_{min})/(\varepsilon_{max} - \varepsilon_{min}) \quad (9a)$$

$$\alpha_{liquid(\sigma)} \sim (\sigma_{avg} - \sigma_{min})/(\sigma_{max} - \sigma_{min}) \quad (10a).$$

The subtraction of the minimum values in Equations (9) and (10) is to remove the effects of sensor drift on the liquid fraction determination. Note that for a single-phase oil, water or gas flow, $\varepsilon_{avg} \simeq \varepsilon_{max} \simeq \varepsilon min$, or $\sigma_{avg} \simeq \sigma_{max} \simeq \sigma_{min}$, so a variance-based threshold is used to avoid miscalculating $\sigma_{liquid}$ for such a flow.

Figure 5A:
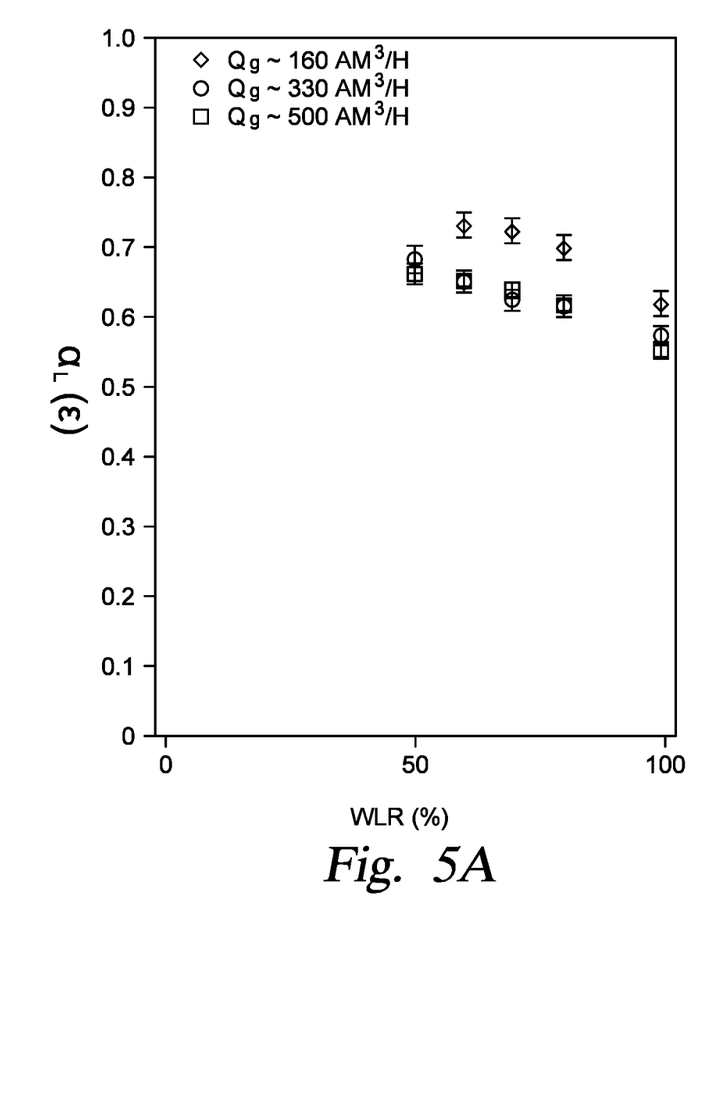
FIGS. 5A and 5B are graphs showing liquid fractions estimated based on measured permittivity (FIG. 5A) and conductivity (FIG. B) for water-continuous (high WLR) flows according to one embodiment.
Figure 5B:
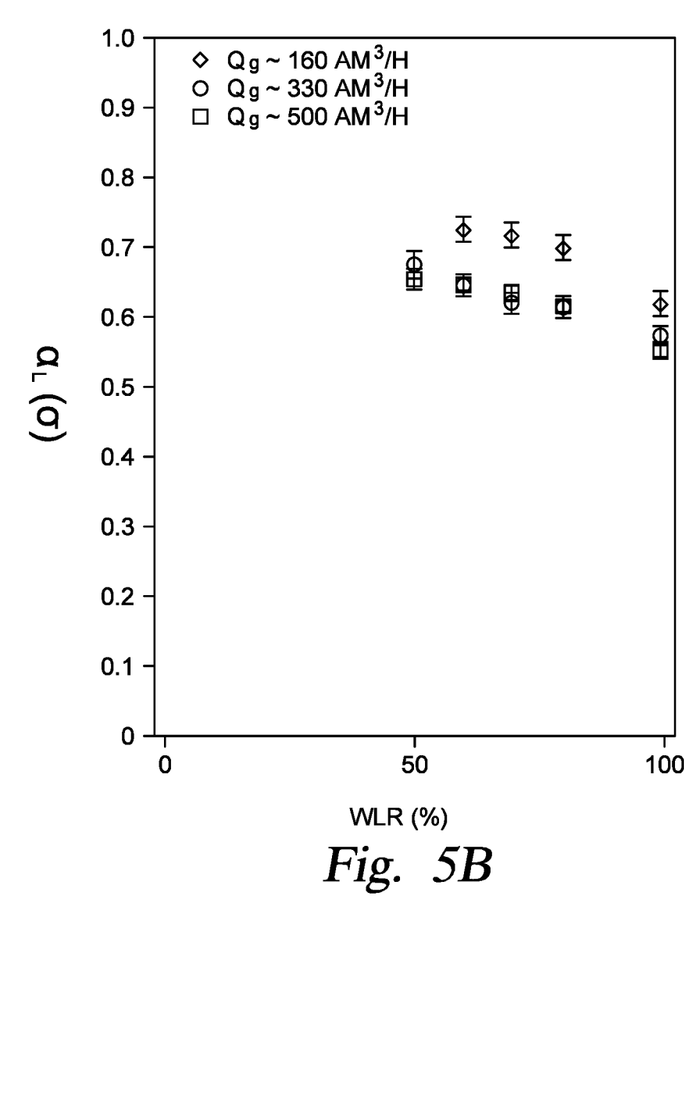

FIG. 5A is a graph of estimated liquid fraction $\alpha_{liquid(\varepsilon)}$ based on Equation (9a) for water-continuous (high WLR) flows corresponding to the data set of FIG. 4A. FIG. 5B is a graph of estimated liquid fraction $\alpha_{liquid(\sigma)}$ estimated based on the Equation (10a) for water-continuous (high WLR) flows corresponding to the data set of FIG. 4B. Estimated liquid fraction $\alpha_{liquid}$ within the sensing volume of the microwave EM sensor, derived from mixture permittivity $\varepsilon_{mix}$ data (FIG. 5A) and mixture conductivity $\sigma_{mix}$ data (FIG. 5B), is plotted vs. the reference WLR.

Figure 6A:
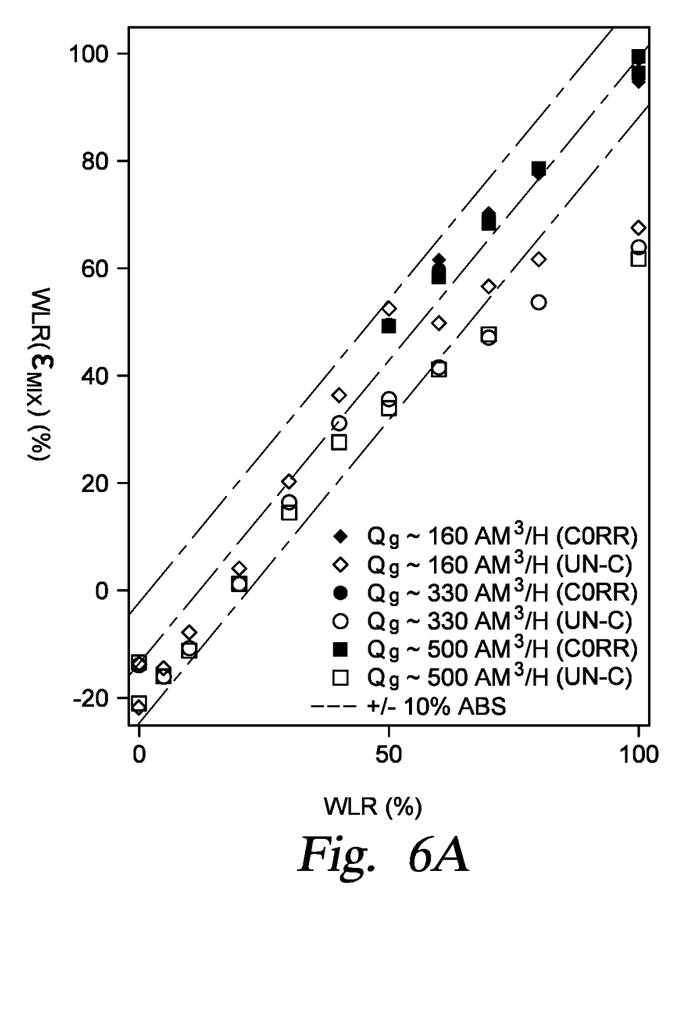
FIGS. 6A and 6B are graphs showing uncorrected and corrected WLR based on permittivity (FIG. 6A), and uncorrected and corrected WLR based on conductivity (FIG. 6B) vs reference WLR according to one embodiment.
Figure 6B:
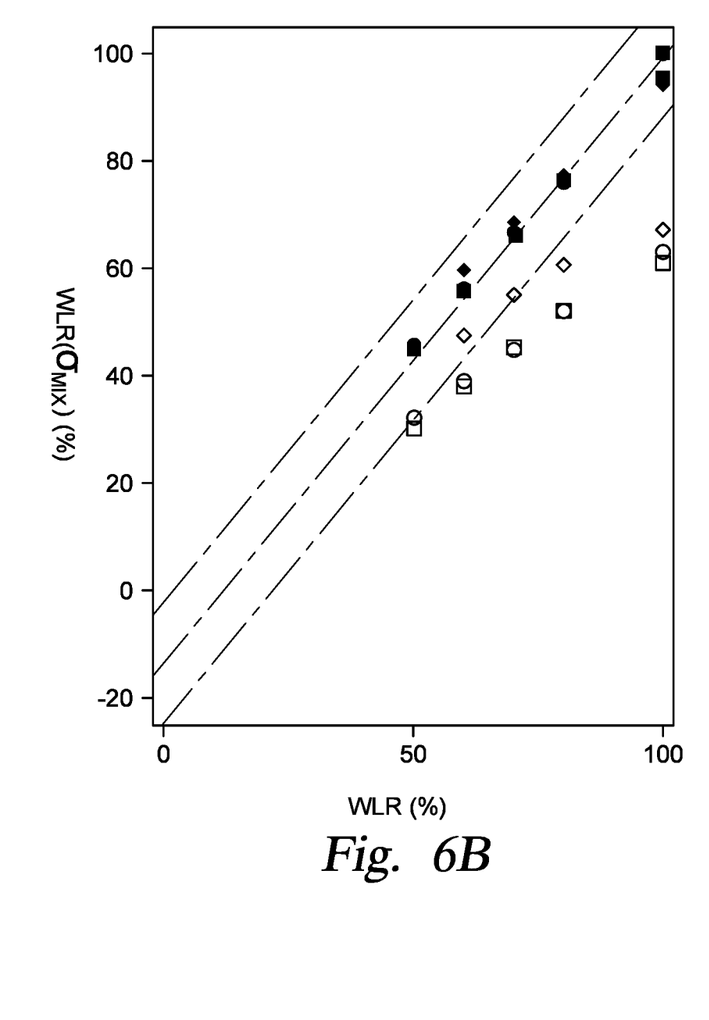

FIGS. 6A and 6B are graphs of WLR derived from Equations (3a) to (5a), by using the liquid fraction $\alpha_{liquid}$ (within the sensing volume of the microwave EM sensor) estimated by using Equations (9) and (10). The graphs of FIGS. 6A and 6B show significant improvement in the WLR estimate for water-continuous high-WLR flows. The WLR estimated from Equations (3a) to (5a) plotted versus the reference WLR, the solid-symbol high-WLR data points has entrained-gas effect correction with the liquid fraction $\alpha_{liquid}$ within the sensing volume of the microwave sensor estimated by Equations (9) and (10) (as illustrated in FIGS. 5A and 5B). The graphs of FIGS. 6A and 6B demonstrate that applying a correction for gas entrainment to estimates of WLR using permittivity and/or conductivity time-series measurements statistical data results in improvement of the estimates. The method includes correcting the effects of the gas entrained in the liquid on the measured mixture permittivity and the mixture conductivity to achieve a good WLR determination. The correction on gas entrainment is found to be especially important for water-continuous flows with relatively high WLRs.

It has been observed that WLR estimates (using an RF/microwave EM sensor alone) at very high-GVF conditions (GVF≥99%) have better absolute accuracy and less statistical noise than estimates based on dual-energy gamma-ray measurement. In addition, the microwave EM sensor can provide water salinity measurement and low water fraction detection. Similarly, WLR determination can also be made under multiphase flow conditions with GVF much less than 90%.

From Equations (3a), (4a), (5a), (7), (9), and (10), salinity-independent WLR determination can be made using microwave EM sensor measurement. As indicated in FIG. 2, the wet-gas or multiphase flow water volume fraction (WVF) can be determined by using the WLR derived from the microwave EM sensor and the GVF determined from a dual-energy gamma-ray system (such as Vx Spectra) or from a microwave transmission system, as follows:

$$WVF = WLR \times (1 - GVF) \quad (11).$$

Figure 7:
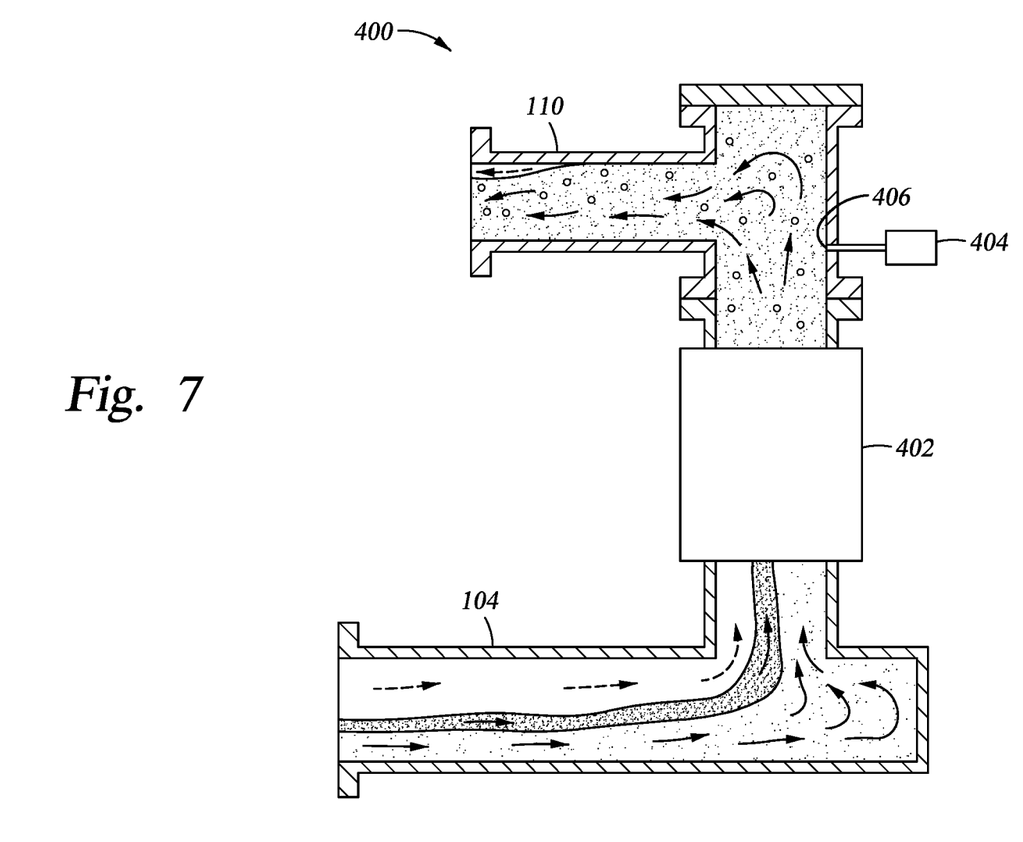
FIG. 7 is an apparatus according to one embodiment.
Figure 8:
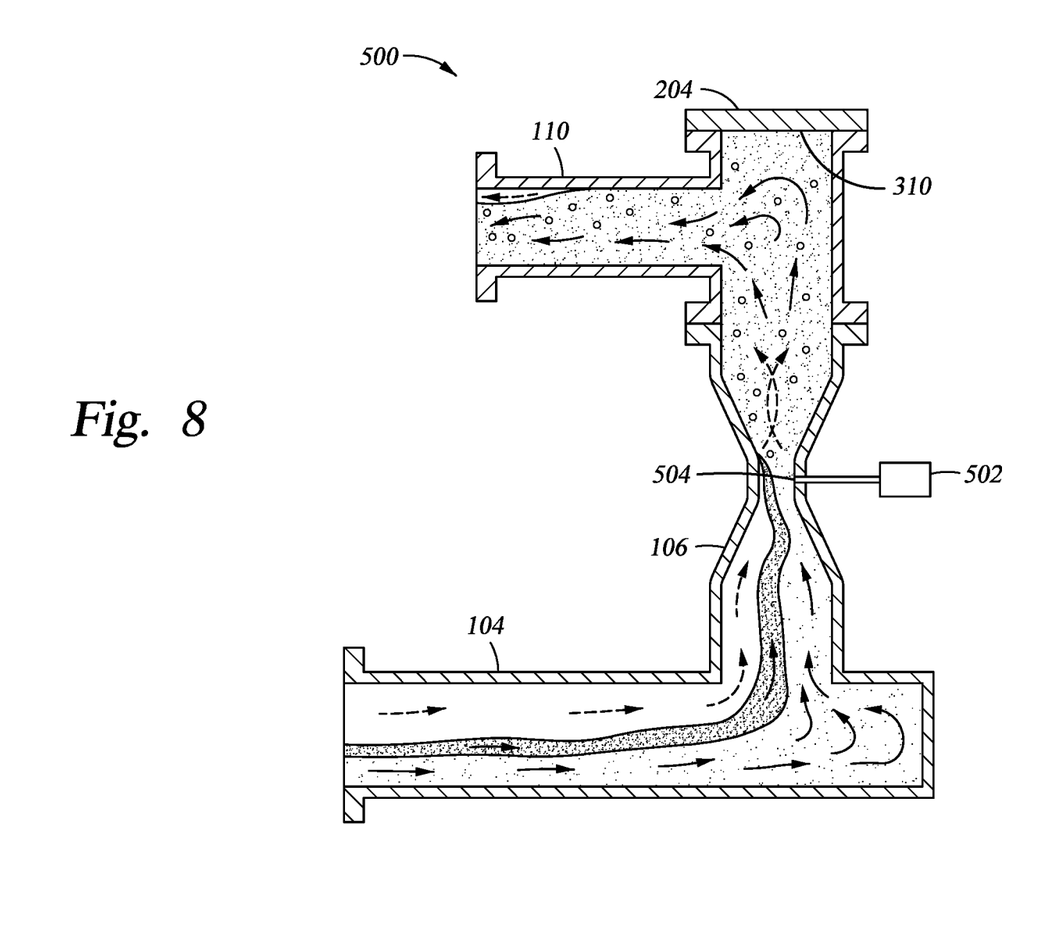
FIG. 8 is an apparatus according to one embodiment.
Figure 9A:
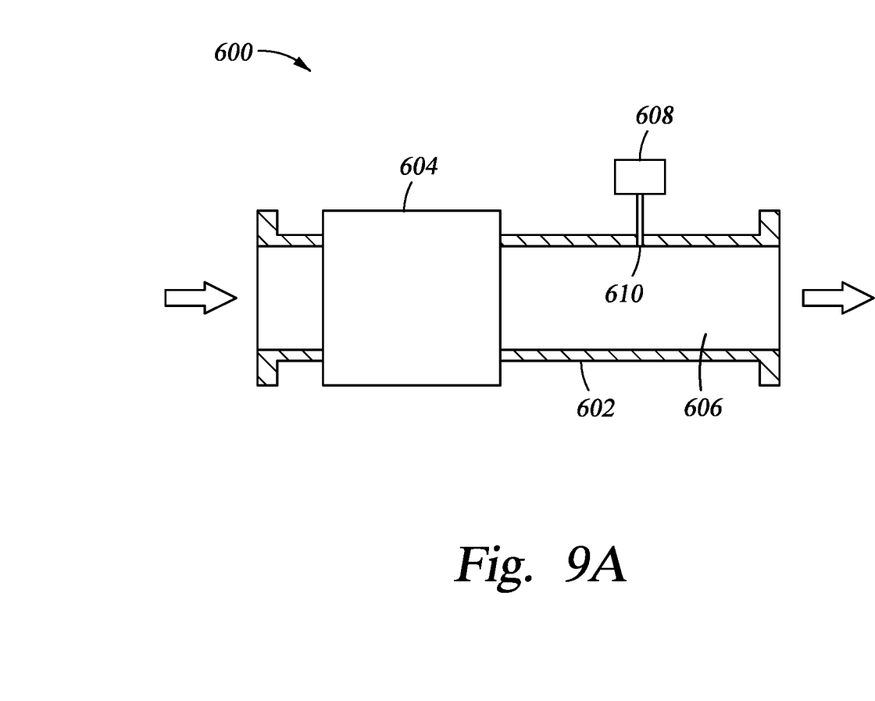
FIG. 9A is an apparatus according to one embodiment.
Figure 9B:
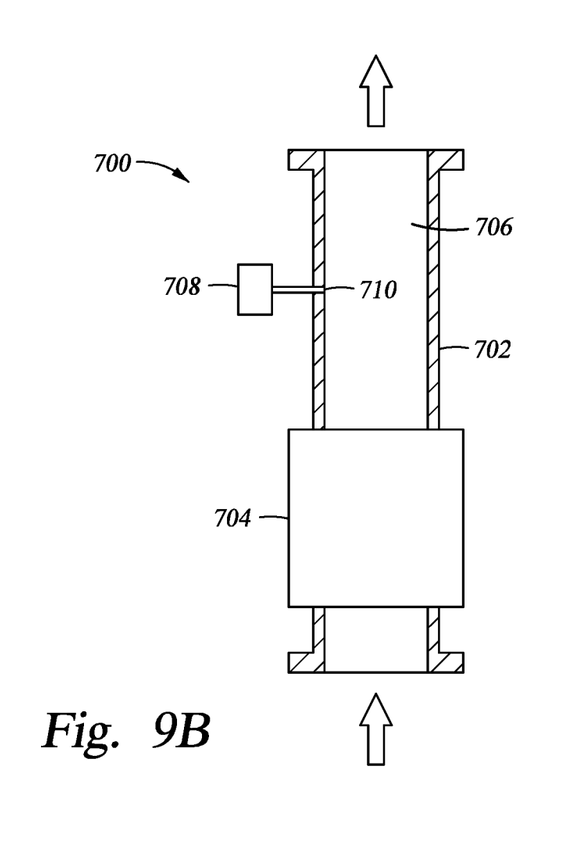
FIG. 9B is an apparatus according to one embodiment.

Other embodiments of using an EM sensor to make the WLR measurement where oil/water tends to be well mixed are shown in FIGS. 7, 8, and 9. FIGS. 7 and 8 show alternative embodiments where an EM sensor for WLR and salinity determination is placed at the downstream of a flow mixer (such as a venturi, a static mixer) with the EM sensor aperture/tip located at the inner-wall liquid-rich region of vertical pipe work, or with the sensor aperture/tip located within the side-wall liquid-rich region of flow mixer (e.g. venturi throat) section. FIG. 7 is an apparatus embodiment 400 with an EM sensor 404 located downstream of a flow mixer 402 in an outlet 110. In the case of FIG. 7, the EM sensor 404 is located at a liquid-rich mixing location 406 in a sidewall of the outlet 110 adjacent to the flow mixer 402 on an opposite side of the outlet 110 from the flow direction of the outlet 110, such that fluid flowing in the outlet 110 along the flow direction flows directly away from the EM sensor 404. FIG. 8 is an apparatus embodiment 500 with an EM sensor 502 located at a liquid-rich mixing location 504 within a mixing zone of the flow mixer 106. In this case, the mixing location 504 is within inner wall of the throat of a venturi.

FIGS. 9A and 9B show alternative embodiments where a standalone EM WLR sensor (such as microwave open-coaxial reflection sensor) is placed at an appropriate distance the downstream of a flow mixer for use with (a) horizontal pipe flow, and (b) vertical pipe flow, with the sensor sensing aperture surface flush mounted with the inner-wall of flow line pipe to measure the WLR of well-mixed oil/water/gas flow. FIG. 9A is an apparatus embodiment 600 with an EM sensor 608 located at a mixing location 610 at a sidewall of a horizontal pipe 602 coupled to the outlet of a flow mixer 604 and carrying a mixed multiphase fluid 606 exiting the flow mixer 604. The EM sensor may be located at other locations such as at the underside of the horizontal pipe 602. FIG. 9B is an apparatus embodiment 700 with an EM sensor 708 located at a mixing location 710 at a sidewall of a vertical pipe 702 coupled to the outlet of a flow mixer 704 and carrying a mixed multiphase fluid 706 exiting the flow mixer 704 in an upward vertical direction. The apparatus embodiments 600 and 700 can be used to practice the methods described herein based on EM measurements of the mixed multiphase fluids 606 and 706 to determine WLR. The EM sensor 608 or 708 may provide a determination of gas-entrained liquid-fraction that is a good estimate of the pipe-averaged GVF value of a well-mixed gas-liquid flow downstream of the flow mixer 604 or 704.

The methods disclose that wet-gas or multiphase flow WLR determination by estimating the liquid fraction (due to gas entrainment) may be applicable to other microwave/EM local measurement sensors such as those based on microwave transmission, mm-wave or THz sensor, optical sensor (such as infrared), electrical capacitance, electrical resistance/conductance, electrical impedance, or electrical inductance sensors. The EM sensor may be used standalone to determine the WLR (and salinity), or used in combination with an MPFM that measures GVF to determine WVF. The EM sensor may be used standalone or in combination with other sensors or flow meters, at surface (topside), downhole or subsea.

Methods are, therefore, disclosed herein that include obtaining a plurality of rapid electromagnetic property measurements from a flowing wet-gas or multiple-phase flow mixture at an electromagnetic sensor location at or downstream a mixing device, obtaining an average, variance, maximum, and minimum of the plurality of rapid electromagnetic property measurements, and determining a liquid fraction of the wet-gas or multiple-phase flow mixture at the electromagnetic sensor location, based on the average, variance, maximum, and minimum. The electromagnetic sensor location is a location selected to provide sufficient oil-water mixing and to be liquid rich at or downstream the mixing device, such that the gas entrainment effect is reduced and is properly characterized by the measurements. As described above, the EM sensor location can be within a mixing device or adjacent to or downstream the mixing device. Mixing devices can be static or dynamic. Examples of static mixing devices include differential pressure devices such as Venturi devices, orifices, and other pipe constriction-based flow meters; in-line mixing structures such as static mixers; and in-line mechanical agitators. As described above, for high flow rate embodiments, agitation of the mixture due to high flow through conduit structures such as bends and turns can provide mixing sufficient for the methods described herein.

In some cases, multiple EM sensors can be used to monitor a mixed wet-gas or multiphase flow. For example, in the apparatus disclosed herein, a first EM sensor could be deployed at a (e.g. horizontal) blind-tee upstream of a flow mixer and a second EM sensor could be deployed at a (e.g. vertical) blind-tee downstream of a flow mixer. EM properties detected by the first EM sensor can be used to determine flow properties favorable for determination in less-mixed environments, such as water presence, concentration of hydrate-inhibitor in water, salinity, and density, while those detected by the second EM sensor can be used to determine flow properties sensitive to oil-water mixing, such as WLR. The properties registered by the two EM sensors can be compared to assist with drift detection and compensation and to check parameters of models, such as brine dielectric or salinity models, used to determine WLR using the EM sensors.

The electromagnetic properties are measured using a rapid response EM sensor with sampling rate (number of measurements per unit time) of at least about 1 kHz. The sampling rate that can be used for the methods herein has no particular upper limit, and may be in the MHz range. EM sensors with rapid response that can be used include a microwave open-coaxial reflection sensor that measures permittivity and conductivity in a small volume around the open aperture/tip of the sensor. Ten kHz is a typical sampling rate to obtain a plurality of measurements. Sampling is performed continuously over moving time windows each with a short period of time, such as 1 or 2 sec, and may be shorter for higher sampling rates. For example, with a sampling rate of 1 MHz, EM data may be sampled continuously and processed based on moving time windows each with a duration of a fraction of a second, such as 0.1 sec, with 100,000 samples for time-series statistical analysis per moving time window.

The EM sensor can provide information usable to determine water salinity, water density, basis for adjusting operation of an associated MPFM, and as described herein, phase flow rates. For example, water salinity can be estimated from multiphase flow mixture complex permittivity, as is known in the art. The EM sensor is typically calibrated by exposing the sensor to materials of known composition, such as air, fresh water, brine, and oil. Known mixtures of such materials can also be used.

In some cases, a bias or drift may enter the EM data captured by the EM sensor. In such cases, measured permittivity and conductivity values may be corrected to compensate for or remove the effect of the drift prior to estimating phase compositions (such as the WLR by (Equations (3a), (4a) (5a)) and flow rates. The drift correction also improves determination of salinity from the EM sensor data.

The drift can be estimated using minimum values of measured EM parameters sampled rapidly over moving time windows with a short time period ($\Delta t$). From a typical high-GVF and low-WLR (wet-gas) flow condition, EM sensor periodically captures an estimate of the 'gas-phase' baseline data ($\varepsilon_{base}$, $\sigma_{base}$) from the instantaneously measured $\varepsilon_{min}(\Delta t)$ and $\sigma_{min}(\Delta t)$ from the respective stable minimum values over a relatively long time duration (such as 100 sec), or from the respective periodically captured empty-pipe data minimum values:

$$\varepsilon_{base} = \langle \varepsilon_{min}(\Delta t) \rangle_{\{high\text{-}GVF, low\text{-}WLR\}, OR \{Empty\text{-}pipe\}} \quad (12a)$$

$$\sigma_{base} = \langle \sigma_{min}(\Delta t) \rangle_{\{high\text{-}GVF, low\text{-}WLR\}, OR \{Empty\text{-}pipe\}} \quad (12b)$$

The drift-corrected mixture permittivity $\hat{\varepsilon}_{avg}(\Delta t)$ and the mixture conductivity $\hat{\sigma}_{avg}(\Delta t)$ can then be expressed as:

$$\hat{\varepsilon}_{avg}(\Delta t) = \varepsilon_{avg}(\Delta t) - (\varepsilon_{min}(\Delta t) - \varepsilon_{base}) \quad (13a)$$

$$\hat{\sigma}_{avg}(\Delta t) = \sigma_{avg}(\Delta t) - (\sigma_{min}(\Delta t) - \sigma_{base}) \quad (13b).$$

Thus, a baseline value for permittivity and conductivity can be estimated from minimum values in a time series of values sampled rapidly over a relatively long duration, such as 10 seconds to 100 seconds, for example by averaging the minimum of the minimum values. The baseline value for each parameter can then be subtracted from the minimum value for each parameter in the time series ($\varepsilon_{min}$, $\sigma_{min}$) to give a drift corrected value for determining average permittivity and conductivity values for use in the models described elsewhere herein. Maximum and minimum values of permittivity and conductivity can also be corrected for baseline drift in the same manner.

The methods described herein are generally implemented using a processing system to receive the fluid EM measurement data from EM sensor(s), store the data, and perform the computations described herein. The methods are usefully implemented in processing instructions, which may be recorded in a computer-readable medium, that cause the processing system to execute the described methods. Processing may be performed local to the process producing the multiphase fluid, or may be remotely connected via any convenient communication network. The various models described herein may be implemented in a processing system that receives fluid EM measurements from EM sensor(s) from more than one production site over a communication network, wired or wireless.

Results generated by the processing system can be used to control the process producing the multiphase fluid or a process performing a refinement, such as separation, purification, preparation for transportation, remediation, or other process, using the multiphase fluid as feed. The production process, such as a water or chemical injection enhanced recovery process, a chemical injection flow-assurance process (surface or subsea), a stimulation process, can be adjusted based on the composition and flow rate results determined by the processing system to optimize recovery of valuable resources. The refinement process can likewise be adjusted to optimize treatment of end products and volume of waste streams.

While the foregoing is directed to embodiments of the present invention, other and further embodiments of the present disclosure may be devised without departing from the basic scope thereof, and the scope thereof is determined by the claims that follow.

What is claimed is:
1. A method, comprising:
   obtaining a plurality of measurements of electromagnetic properties of a multiphase fluid mixture, from which at least one of permittivity or conductivity can be determined, at an electromagnetic sensor location located at or downstream from a mixing device;
   obtaining an average, maximum, and minimum of the plurality of measurements at the electromagnetic sensor location over a time period; and determining a liquid fraction of the multiphase fluid mixture at the electromagnetic sensor location based on the average, maximum, and minimum of the plurality of measurements at the electromagnetic sensor location over the time period.

2. The method of claim 1, wherein at least one of the electromagnetic properties is permittivity.

3. The method of claim 1, wherein the electromagnetic sensor location is at a horizontal blind-tee end flange adjacent to the mixing device, or at a vertical blind-tee end flange downstream from the mixing device.

4. The method of claim 1, wherein the electromagnetic sensor location is within the mixing device.

5. The method of claim 1, further comprising determining a water-to-liquid ratio based on the liquid fraction and the plurality of measurements of electromagnetic properties.

6. The method of claim 1, further comprising determining a water volume fraction of the multiphase fluid mixture based on a water-to-liquid ratio and a gas volume fraction of the multiphase fluid mixture determined by a flow meter within the mixing device.

7. The method of claim 1, further comprising correcting at least one of the average, maximum, and minimum for baseline drift of the plurality of measurements of electromagnetic properties.

8. The method of claim 1, further comprising adjusting a processing condition of the multiphase fluid mixture based on at least one of a water-to-liquid ratio, a water volume fraction, or a gas volume fraction.

9. The method of claim 1, wherein the electromagnetic sensor location is a first electromagnetic sensor location and the plurality of measurements of electromagnetic properties is a first plurality of measurements of electromagnetic properties, and further comprising obtaining a second plurality of measurements of electromagnetic properties from the multiphase fluid mixture at a second electromagnetic sensor location, obtaining an average, maximum, and minimum of the second plurality of measurements of electromagnetic properties, determining a comparison between at least one of the average, maximum, or minimum of the second plurality of measurements of electromagnetic properties and a corresponding average, maximum, or minimum of the first plurality of measurements of electromagnetic properties, and adjusting a parameter used to determine the liquid fraction, or a water-to-liquid ratio of the multiphase fluid mixture based on the comparison.

10. The method of claim 1, wherein a first liquid fraction is determined based on the average, maximum, and minimum of permittivity data and a second liquid fraction is determined based on the average, maximum, and minimum of conductivity data.

11. A method, comprising:
obtaining a plurality of permittivity and conductivity measurements from a flowing multiphase fluid mixture at an electromagnetic sensor location located at or downstream a mixing device;
obtaining an average, maximum, and minimum of the plurality of permittivity measurements at the electromagnetic sensor location over a time period and of the plurality of conductivity measurements at the electromagnetic sensor location over the time period;
determining a liquid fraction of the flowing multiphase fluid mixture at the electromagnetic sensor location based on the average, maximum, and minimum of one or both of the plurality of permittivity measurements at the electromagnetic sensor location over the time period and the plurality of conductivity measurements at the electromagnetic sensor location over the time period; and
determining a water-to-liquid ratio of the flowing multiphase fluid mixture based on the liquid fraction.

12. The method of claim 11, wherein the electromagnetic sensor location is at a blind-tee adjacent to the mixing device.

13. The method of claim 11, wherein the electromagnetic sensor location is within the mixing device.

14. The method of claim 11, further comprising determining the water-to-liquid ratio based on the liquid fraction and one or both of the plurality of permittivity measurements and the plurality of conductivity measurements.

15. The method of claim 11, further comprising determining a water volume fraction of the flowing multiphase fluid mixture based on the water-to-liquid ratio and a gas volume fraction of the flowing multiphase fluid mixture determined by a flow meter within the mixing device.

16. The method of claim 11, further comprising correcting at least one of the average, maximum, and minimum for baseline drift of one or both of the plurality of permittivity measurements and the plurality of conductivity measurements.

17. The method of claim 11, further comprising adjusting a processing condition of the flowing multiphase fluid mixture based on at least one of the water-to-liquid ratio, a water volume fraction, or a gas volume fraction.

18. The method of claim 11, wherein the electromagnetic sensor location is a first electromagnetic sensor location, the plurality of permittivity measurements is a first plurality of permittivity measurements, and the plurality of conductivity measurements is a first plurality of conductivity measurements, and further comprising obtaining a second plurality of permittivity measurements and a second plurality of conductivity measurements from the flowing multiphase fluid mixture at a second electromagnetic sensor location, obtaining an average, maximum, and minimum at the second electromagnetic sensor location over the time period of the second plurality of permittivity measurements and of the second plurality of conductivity measurements, determining a comparison of at least one of the average, maximum, or minimum of the second plurality of permittivity or conductivity measurements and a corresponding average, maximum, or minimum of the first plurality of permittivity or conductivity measurements, and adjusting a parameter used to determine the liquid fraction or the water-to-liquid ratio of the multiphase fluid mixture based on the comparison.

19. A method, comprising:
repeatedly measuring permittivity and conductivity of a multiphase fluid using an electromagnetic sensor with a sampling rate of at least 1 kHz to obtain at least 100 measurements at an electromagnetic sensor location over a time period;
obtaining an average, maximum, and minimum of the permittivity measurements and of the conductivity measurements at the electromagnetic sensor location over the time period;
determining a liquid fraction from the average, maximum, and minimum of one or both of the permittivity measurements and the conductivity measurements at the electromagnetic sensor location over the time period; and
determining a water-to-liquid ratio of the multiphase fluid based on the liquid fraction and based on one or both of the permittivity measurements and the conductivity measurements.

20. The method of claim 19, further comprising adjusting a processing condition of the multiphase fluid mixture based on the liquid fraction or the water-to-liquid ratio.

* * * * *